US009210395B2

(12) United States Patent
Itou et al.

(10) Patent No.: US 9,210,395 B2
(45) Date of Patent: Dec. 8, 2015

(54) IMAGE PROCESSING DEVICE AND IMAGE PROCESSING METHOD

(71) Applicant: Sony Corporation, Tokyo (JP)

(72) Inventors: Takashi Itou, Saitama (JP); Hiroki Ohtsuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 453 days.

(21) Appl. No.: 13/783,671

(22) Filed: Mar. 4, 2013

(65) Prior Publication Data

US 2013/0235150 A1 Sep. 12, 2013

(30) Foreign Application Priority Data

Mar. 12, 2012 (JP) ................. 2012-054344

(51) Int. Cl.
H04N 13/00 (2006.01)
H04N 5/361 (2011.01)
H04N 5/367 (2011.01)
G06T 1/00 (2006.01)
H04N 5/228 (2006.01)
H04N 7/18 (2006.01)
H04N 5/357 (2011.01)

(52) U.S. Cl.
CPC .............. *H04N 13/0007* (2013.01); *G06T 1/00* (2013.01); *H04N 5/361* (2013.01); *H04N 5/367* (2013.01); *H04N 5/3572* (2013.01)

(58) Field of Classification Search
CPC . H04N 13/0007; H04N 5/3676; H04N 5/361; H04N 5/3572; H04N 5/228; G06K 9/34
See application file for complete search history.

(56) References Cited

U.S. PATENT DOCUMENTS 7,486,309 B2 * 2/2009 Knoedgen et al. ............ 348/187
2011/0310267 A1* 12/2011 Ichiyama et al. .......... 348/222.1
2014/0028806 A1* 1/2014 Endo ............................. 348/49
2015/0062308 A1* 3/2015 Ishiga .......................... 348/49

FOREIGN PATENT DOCUMENTS

JP 2000-312311 A 11/2000

* cited by examiner

Primary Examiner — Dave Czekaj
Assistant Examiner — Dramos I Kalapodas
(74) Attorney, Agent, or Firm — Hazuki International, LLC

(57) ABSTRACT

There is provided an image processing device including an image input unit that performs image division on an input image, an evaluation value generation unit that generates an evaluation value based on an image signal of the input image, and a plurality of signal processing units that perform signal processing on the image signal based on the evaluation value generated by the evaluation value generation unit, wherein the plurality of signal processing units perform the signal processing using image signals of divided images divided by the image input unit.

11 Claims, 9 Drawing Sheets

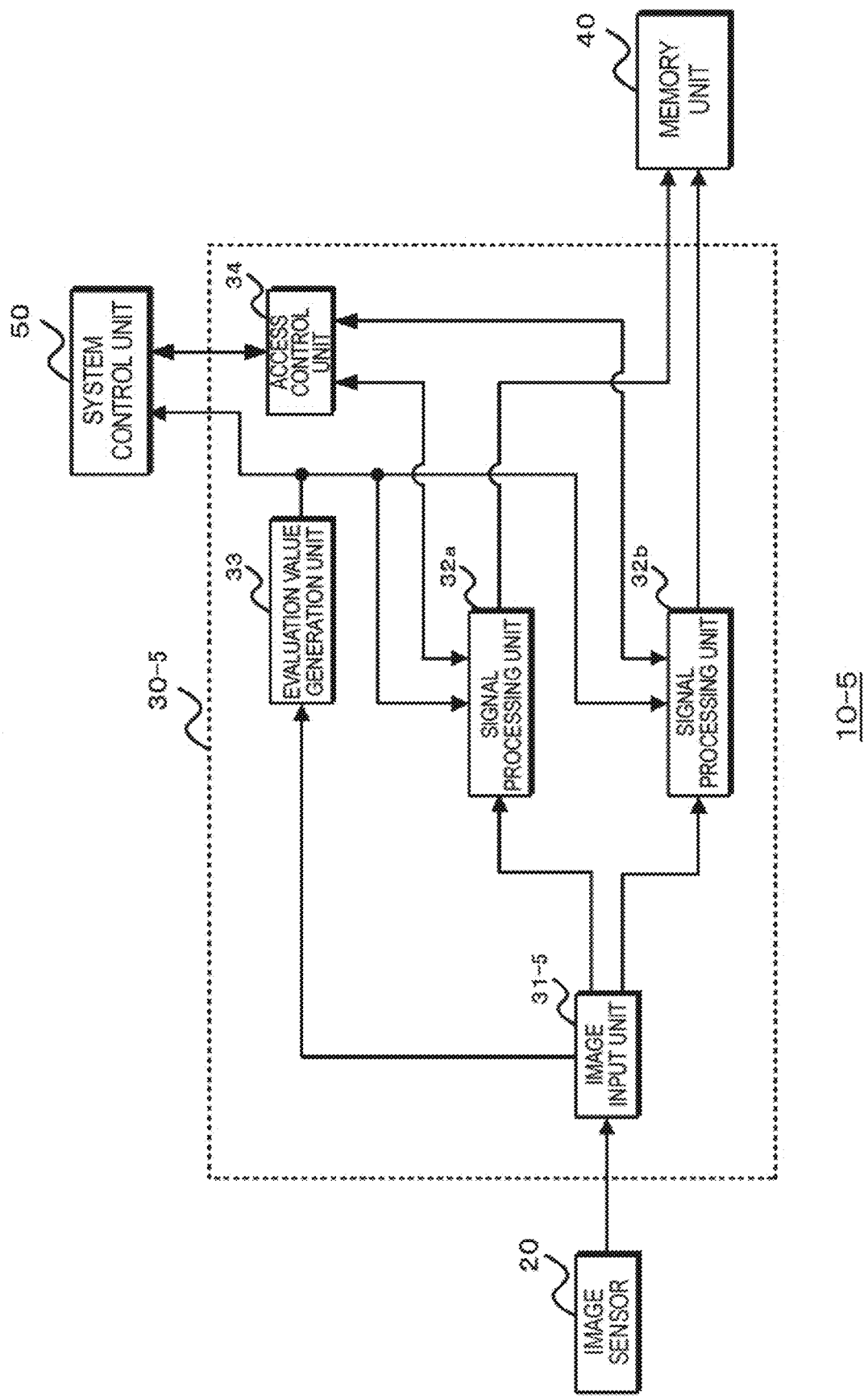

IMAGE PROCESSING DEVICE AND IMAGE PROCESSING METHOD

CROSS-REFERENCE TO RELATED APPLICATION

The present application claims priority from Japanese Patent Application No. JP 2012-054344 filed in the Japanese Patent Office on Mar. 12, 2012, the entire content of which is incorporated herein by reference.

BACKGROUND

The present technology relates to an image processing device and an image processing method, and more particularly, to an image processing device and an image processing method capable of performing signal processing on an image signal easily and quickly.

In the related art, high definition has been designed for imaging devices, and thus a signal amount also increases with the high definition. Accordingly, an image region is divided two-dimensionally spatially and signal processing on each image region is performed by a plurality of signal processing circuits in parallel so that the signal processing can be performed quickly, as disclosed in Japanese Unexamined Patent Application Publication No. 2000-312311.

However, when the plurality of signal processing circuits are provided, control load may increase due to the fact that which signal processing is performed in each signal processing circuit should be controlled.

It is desirable to provide an image processing device and an image processing method capable of performing signal processing on an image signal easily and quickly.

According to a first embodiment of the present technology, there is provided an image processing device including an image input unit that performs image division on an input image, an evaluation value generation unit that generates an evaluation value based on an image signal of the input image, and a plurality of signal processing units that perform signal processing on the image signal of the input image based on the evaluation value generated by the evaluation value generation unit. The plurality of signal processing units perform the signal processing using image signals of divided images divided by the image input unit.

SUMMARY

In the embodiment of the present technology, the evaluation value is generated based on the image signal of the input image, and the plurality of signal processing units perform the signal processing on the image signal of the input image based on the generated evaluation value. For example, the input image is divided into images, and the signal processing is performed using the image signal obtained after the correction process on the divided image. Image combining is performed using the image signal subjected to the correction process and the evaluation value is generated using a reduced image of the combined image. The signal processing is performed on the image signal obtained after the correction process on each divided image using the generated evaluation value. In the division of the input image, the number of visions is set in accordance with the number of signal processing units. One or more of the signal processing units acquiring a control value for controlling the signal processing are designated based on address information associated with the control value, and the designated signal processing unit performs the signal processing based on the acquired control value. The image processing device may perform the signal processing on each divided image and may also perform signal processing, for example, such that image signals of different viewpoints or image signals of a moving image and a still image are processed in parallel. Further, the input image may be distributed to the plurality of signal processing units for each frame and the signal processing may be performed in parallel. In the signal processing on the image signals of the different viewpoints, for example, the evaluation value is generated based on an image signal of a predetermined viewpoint. The evaluation values may be generated for the image signal of the predetermined viewpoint and each image signal of a different viewpoint and evaluation values obtained by performing statistical processing on the plurality of generated evaluation values may be output to the plurality of signal processing units. In the signal processing of the moving image and the still image, the evaluation value is generated based on the image signal of the moving image. Further, when the input image is distributed to the plurality of signal processing units for each frame and the signal processing is performed, an image may be selected in accordance with the distribution of the input image and the evaluation value may be generated based on an image signal of the selected image.

According to a second embodiment of the present technology, there is provided an image processing method including performing image division on an input image, generating an evaluation value based on an image signal of the input image, and performing signal processing on image signals of divided images divided through the image division based on the generated evaluation value.

According to the embodiment of the present technology, the input image is subjected to the image division. Further, the evaluation value generation unit generates the evaluation value based on the image signal of the input image and the plurality of signal processing units perform the signal processing on the image signals of the divided images. Therefore, the plurality of signal processing units can be controlled collectively, even when the evaluation value is not generated by each of the plurality of signal processing units and which signal processing is performed is not controlled. Accordingly, it is possible to prevent an increase in control load caused by providing the plurality of signal processing units.

BRIEF DESCRIPTION OF THE DRAWINGS

FIG. 9 is a diagram illustrating an exemplified configuration according to a fifth embodiment.

DETAILED DESCRIPTION OF THE EMBODIMENTS

Figure 1:
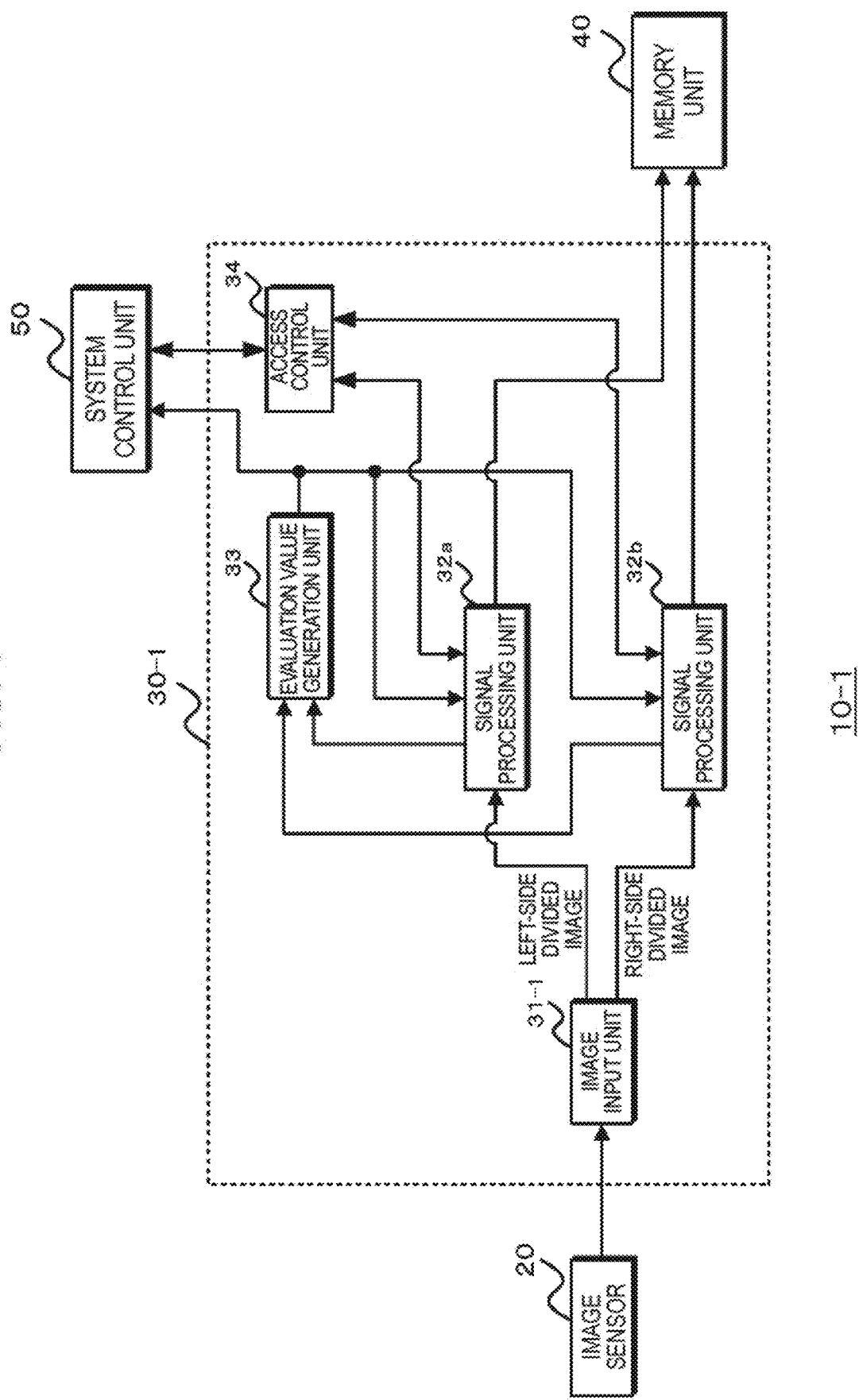
FIG. 1 is a diagram illustrating an exemplified configuration according to a first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments of the present technology will be described. The description will be made in the following order.

1. First Embodiment
2. Second Embodiment
3. Third Embodiment
4. Fourth Embodiment
5. Fifth Embodiment

1. First Embodiment

In a first embodiment, a case in which an image region is divided two-dimensionally spatially and signal processing on each image region is performed by a plurality of signal processing circuits in parallel will be described. In the following description, an image region is divided into two regions.

[1-1. Configuration in First Embodiment]

FIG. 1 is a diagram illustrating an exemplified configuration according to the first embodiment of the present technology. An image processing system 10-1 includes an image sensor 20, an image processing unit 30-1, a memory unit 40, and a system control unit 50.

The image sensor 20 is configured using an imaging element such as a CCD or a CMOS and outputs an image signal generated by the imaging element to the image processing unit 30-1.

The image processing unit 30-1 performs various processes such as a correction process and camera signal processing on the image signal output from the image sensor 20 in parallel. The image processing unit 30-1 outputs image signals obtained by performing the signal processing in parallel to the memory unit 40.

For example, the memory unit 40 stores the image signals obtained by performing the signal processing in parallel to integrate and output the image signals subjected to the parallel signal processing.

The system control unit 50 controls the image sensor 20, the image processing unit 30-1, and the memory unit 40 so that a desired image signal can be obtained.

The image processing unit 30-1 may be integrally formed with the memory unit 40, the system control unit 50, or the like. Alternatively, the image processing unit 30-1 may be formed as an integrated circuit and may be configured to be separate from the image sensor 20 or the memory unit 40 and the system control unit 50.

The image processing unit 30-1 includes an image input unit 31-1, signal processing units 32a and 32b, an evaluation value generation unit 33, and an access control unit 34.

For example, the image input unit 31-1 divides the image signal read from the image sensor 20 into signals of two image regions. The image input unit 31-1 outputs the image signal of one image region to the signal processing unit 32a and outputs the image signal of the other image region to the image processing unit 32b. In the image division, the number of divisions is set for the input image in accordance with the number of signal processing units so that the plurality of signal processing units can perform signal processing in parallel. For example, the image input unit 31-1 divides the input image into signals of two horizontal image regions so that the signal processing units 32a and 32b can perform the signal processing in parallel. Further, the image input unit 31-1 may set division positions in an oblique direction and divide the input image so that the input image is divided into signals of a plurality of image regions in the vertical direction.

The signal processing unit 32a performs various kinds of signal processing on the image signal supplied from the image input unit 31-1. The signal processing unit 32a performs a correction process, such as pixel defect correction, black level correction, or shading correction, for the image sensor 20 or the like on the image signal. Further, the signal processing unit 32a performs various kinds of signal processing on the image signal subjected to the correction process to realize high image quality based on an evaluation value generated by the evaluation value generation unit 33 or a control value supplied from the system control unit 50 via the access control unit 34. For example, the signal processing unit 32a performs control such as exposure adjustment or white balance adjustment based on the evaluation value and performs various control settings based on the control value from the system control unit 50. The signal processing unit 32a outputs the image signal subjected to the correction process to the evaluation value generation unit 33.

The signal processing unit 32b performs the same process as the signal processing unit 32a. That is, the signal processing unit 32b performs a correction process for the image sensor 20 or the like on the image signal supplied from the image input unit 31-1. Further, the signal processing unit 32a performs various kinds of signal processing on the image signal subjected to the correction process to realize high image quality based on an evaluation value generated by the evaluation value generation unit 33 or a control value supplied from the system control unit 50 via the access control unit 34. The signal processing unit 32b outputs the image signal subjected to the correction process to the evaluation value generation unit 33.

The evaluation value generation unit 33 performs image combining using the image signal supplied from the signal processing unit 32a and the image signal supplied from the signal processing unit 32b and generates an image signal of an undivided image. Further, the evaluation value generation unit 33 performs a detection process using the image signal generated through the image combining and generates an evaluation value.

Figure 2:
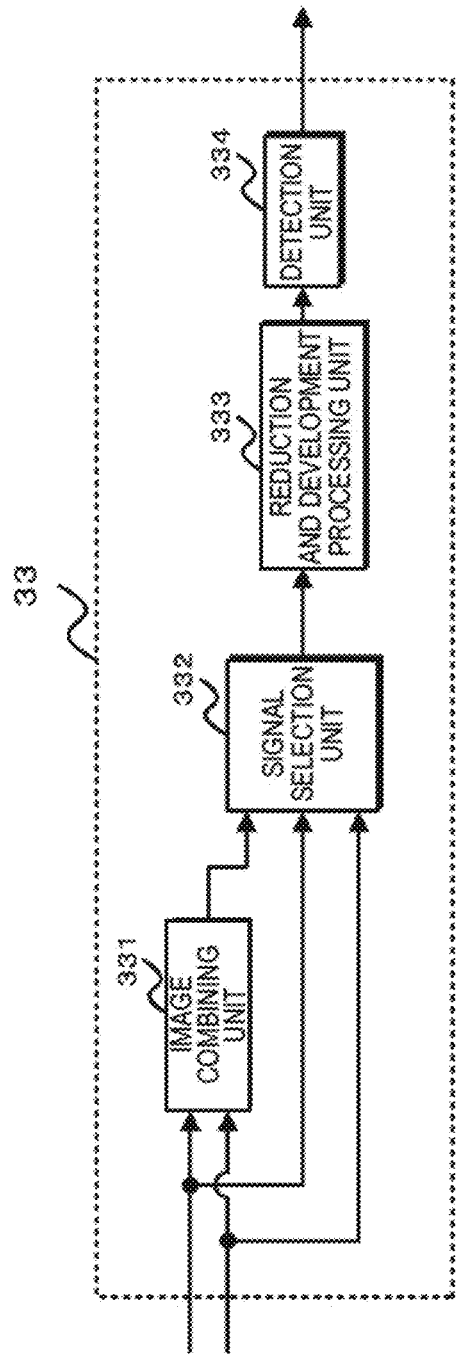
FIG. 2 is a diagram illustrating an exemplified configuration of an evaluation value generation unit.

FIG. 2 is a diagram illustrating an exemplified configuration of the evaluation value generation unit. The evaluation value generation unit 33 includes an image combining unit 331, a signal selection unit 332, a reduction and development processing unit 333, and a detection unit 334.

The image combining unit 331 performs the image combining using the image signal supplied from the image signal processing 32a and the image signal supplied from the signal processing unit 32b, generates an image signal of an undivided image, and supplies the image signal of the undivided image to the signal selection unit 332.

The signal selection unit 332 selects an image signal to be used in generation of an evaluation value. When the signal selection unit 332 generates the evaluation value from the image signal of the undivided image, the signal selection unit 332 selects the image signal generated by the image combining unit 331 and outputs the selected image signal to the reduction and development processing unit 333. Further, as in embodiments to be described below, when the signal selection unit 332 generates the evaluation value from the image signal used by the signal processing unit 32a or the signal processing unit 32b, the signal selection unit 332 selects the image signal supplied from the signal processing unit 32a or the signal processing unit 32b and outputs the selected image signal to the reduction and development processing unit 333.

The reduction and development processing unit 333 performs an image reduction process or a development process using the image signal selected by the signal selection unit 332 and outputs the processed image signal to the detection unit 334. Thus, by reducing the image, it is possible to reduce a signal amount of the image signal to be used in generation of the evaluation value by the detection unit 334 more than the image signal selected by the signal selection unit 332. Further, even by performing the development process, the evaluation value corresponding to an image subjected to signal processing can be easily generated by the detection unit 334.

The detection unit 334 performs a detection process using the image signal supplied from the reduction and development processing unit 333 and generates an evaluation value. For example, the detection unit 334 generates the evaluation value to be used in control such as exposure adjustment, focus adjustment, or white balance adjustment by determining the brightness, contrast, color distribution, or the like of an image. The detection unit 334 outputs the generated evaluation value to the signal processing unit 32a and the signal processing unit 32b.

The access control unit 34 shown in FIG. 1 is connected to the system control unit 50. The system control unit 50 includes a central processing unit (CPU), a read-only memory (ROM), and a random access memory (RAM). The system control unit 50 causes the CPU to execute a program stored in the ROM or the like and controls which signal processing is performed in the image processing unit 30-1. For example, the system control unit 50 generates control values used to control or set which signal processing is performed in the signal processing units 32a and 32b and outputs the generated control values to the image processing unit 30-1. Further, the system control unit 50 controls the signal processing of the signal processing units 32a and 32b based on the evaluation values generated by the evaluation value generation unit 33 of the image processing unit 30-1. For example, the system control unit 50 generates a control value used for, for example, a process of reducing the luminance of an overexposed portion when there is a concern that an image is brightly overexposed or a process of adjusting a dynamic range so that an image with desired contrast can be obtained, and outputs the generated control value to the image processing unit 30-1.

Incidentally, when the signal processing is performed in parallel, control setting from the system control unit 50 may increase with an increase in the number of signal processing units. However, in considerable control setting for the signal processing unit 32a and the signal processing unit 32b, the control values used for the control or setting are the same value. Therefore, when the same control value is used, the access control unit 34 designates one or a plurality of signal processing units performing the control setting based on an address signal designated by the system control unit 50 and causes the control value supplied from the system control unit 50 to be used in the designated signal processing units. Thus, by enabling processes for the plurality of signal processing units by single control setting, an increase in the control setting process can be suppressed.

An address signal, a data signal, and a select signal are used as access signals from the system control unit to each signal processing unit. Each signal processing unit can have access only when the select signal is active. Therefore, the access control unit 34 generates the select signal based on the address signal from the system control unit 50 and designates the signal processing unit performing the control setting. For example, in a case of address A1, the select signal for the signal processing unit 32a is set to be active and the control value is supplied to the signal processing unit by the data signal. In a case of address A2, the select signal for the signal processing unit 32b is set to be active and the control value is supplied to the signal processing unit by the data signal. In a case of address A3, the select signal for the signal processing units 32a and 32b is set to be active and the control value is supplied to the signal processing units by the data signal.

Thus, the select signal is generated to designate one or a plurality of signal processing units based on the address signal, and the designated signal processing unit performs the control setting using the control value indicated by the data signal. Therefore, since the control setting on the plurality of signal processing units can be enabled by single control setting, the increase in the control load can be suppressed.

[1-2. Operation in First Embodiment]

Figure 3:
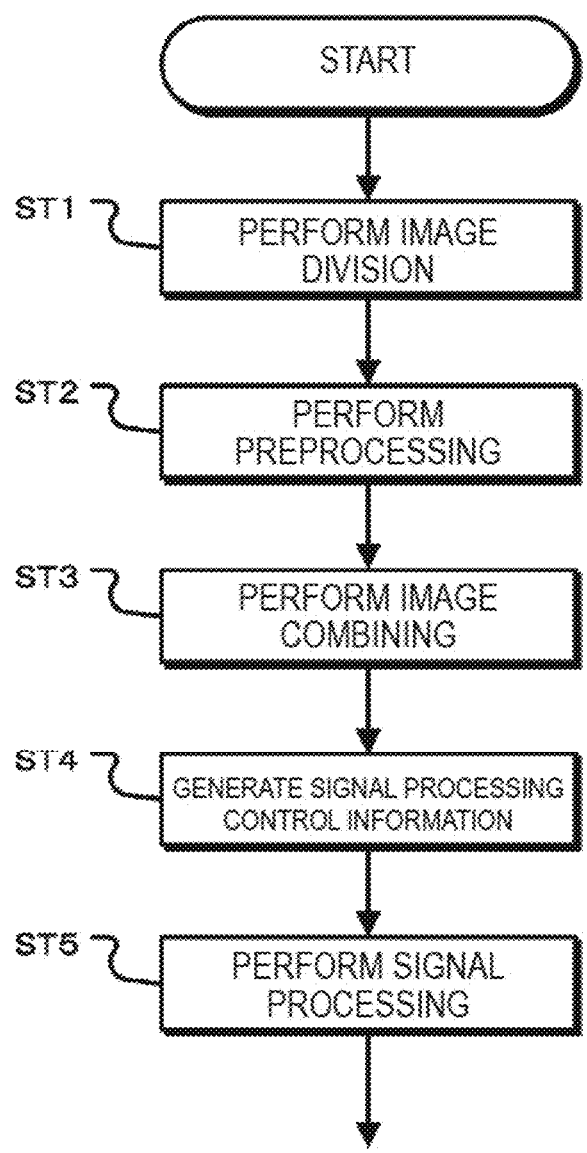
FIG. 3 is a flowchart illustrating an operation according to the first embodiment.

FIG. 3 is a flowchart illustrating an operation according to the first embodiment. In step ST1, the image processing unit 30-1 performs the image division. The image processing unit 30-1 divides the image region two-dimensionally spatially to generate the image signal of each region, and then the process proceeds to step ST2.

In step ST2, the image processing unit 30-1 performs the correction process on the image signals obtained after the image division in parallel. The image processing unit 30-1 performs the correction process such as defect correction or black level correction on the image signals obtained after the image division in parallel, and then the process proceeds to step ST3.

In step ST3, the image processing unit 30-1 performs the image combining using the image signals subjected to the correction process. The image processing unit 30-1 performs the image combining using the image signals subjected to the correction process and generates an image signal of an image obtained by performing the correction process on an undivided image, and then the process proceeds to step ST4.

In step ST4, the image processing unit 30-1 generates the evaluation value from the image signal obtained after the image combining. The image processing unit 30-1 performs a detection process using the image signal obtained after the image combining and generates the evaluation value used for the control such as exposure adjustment or white balance adjustment, and the process proceeds to step ST5. Further, the image processing unit 30-1 performs the image reduction process or the development process so that the generation of the evaluation value can be easily performed, and performs the detection process using the processed image signal.

In step ST5, the image processing unit 30-1 performs the signal processing in parallel based on the generated evaluation value. The image processing unit 30-1 uses the evaluation value generated in step ST4 commonly in the signal processing on the image signals obtained after the image division and performs the signal processing such as exposure adjustment or white balance adjustment in parallel.

Thus, when the image region is divided two-dimensionally spatially and the signal processing on each image region is performed in parallel by a plurality of signal processing circuits, the evaluation value is generated from the undivided image, and the evaluation value is supplied to each processing unit. Accordingly, even when the evaluation value is not generated by each of the plurality of signal processing units and which signal processing is performed is not controlled, the plurality of signal processing units can be controlled collectively. Therefore, even when the image region is divided and the signal processing is performed in parallel, it is possible to prevent the increase in the control load. Further, since the image used in the evaluation value generation unit is subjected to the correction process, the evaluation value with higher accuracy can be generated.

Figure 4:
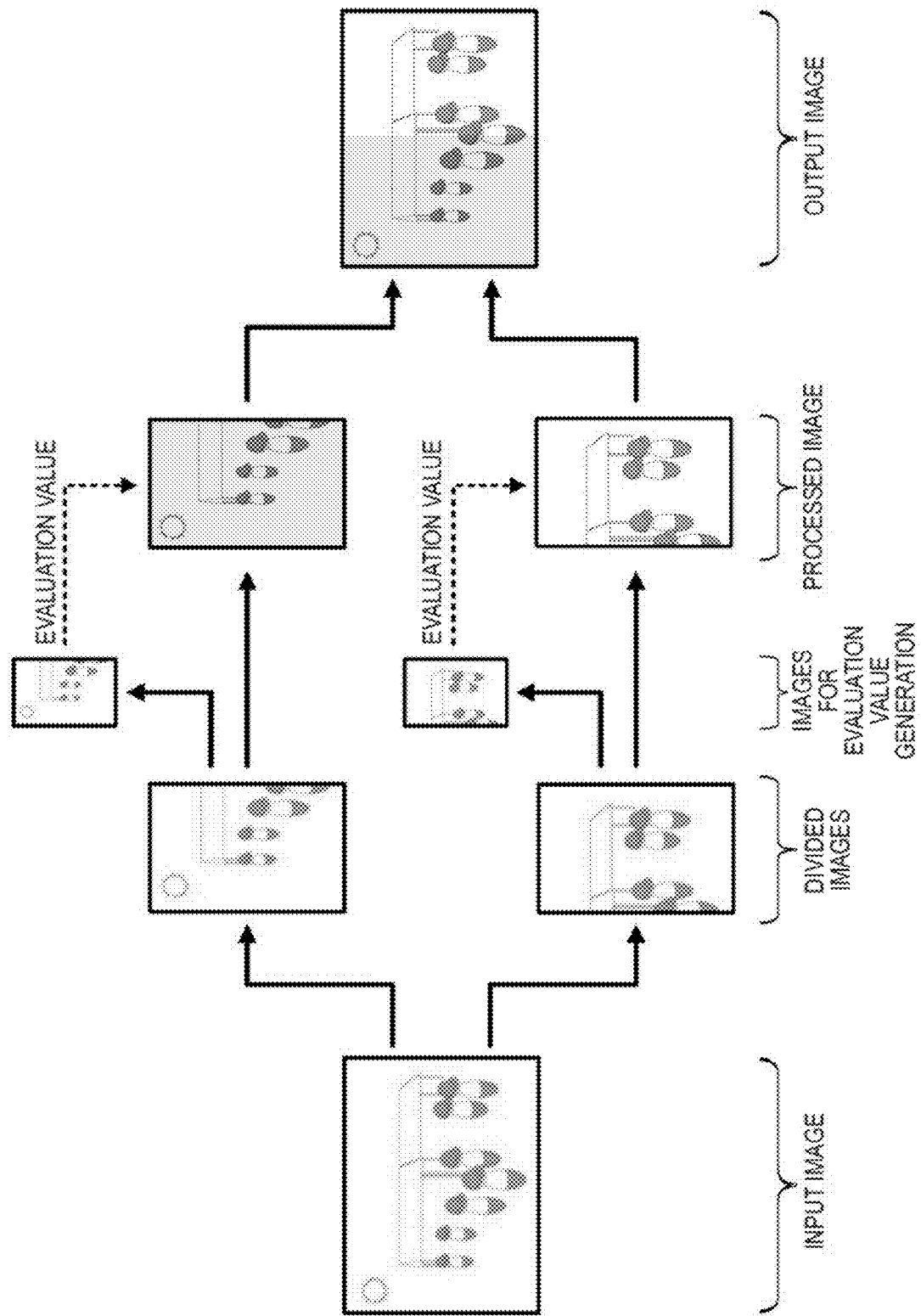
FIG. 4 is a diagram illustrating an exemplified case in which an evaluation value is generated for each image region and signal processing is performed.
Figure 5:
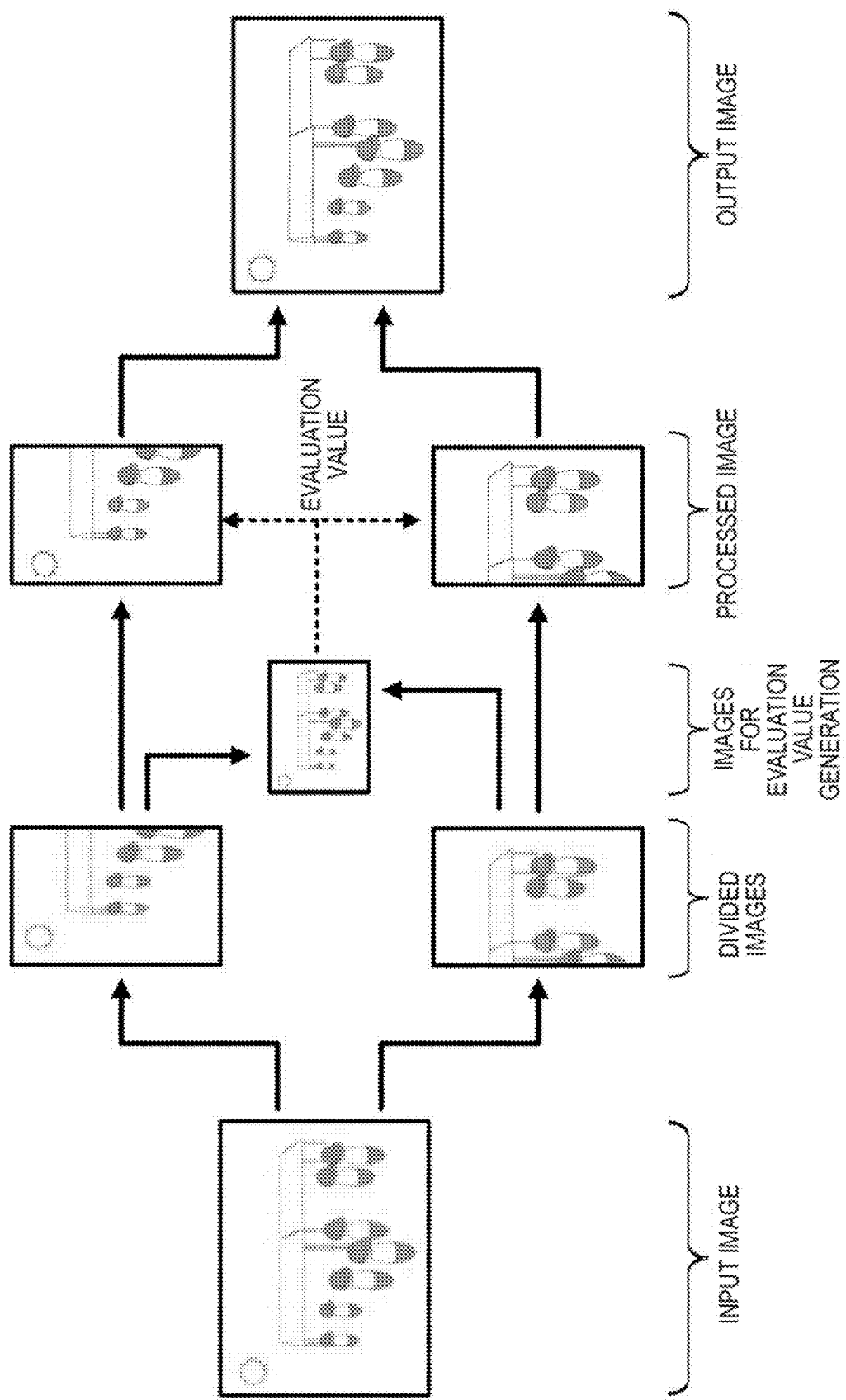
FIG. 5 is a diagram illustrating an exemplified case in which an evaluation value is generated based on a combined image and signal processing is performed.

When an evaluation value is generated according to an image processed by each signal processing unit, there is a concern that an output image may become an unnatural image. For example, when an input image is divided and evaluation values are generated using the divided images as images for evaluation value generation, as shown in FIG. 4, different evaluation values are generated between the divided images. Therefore, there is a concern that the image subjected to the signal processing may become an image subjected to different signal processing. In this case, an output image obtained by combining the processed divided images may become an unnatural image due to the fact that different signal processing is performed between the image regions. In the first embodiment, however, as shown in FIG. 5, the divided images are combined and an undivided image is used as an image for evaluation value generation. Accordingly, since the image subjected to the signal processing is an image subjected to the same signal processing, there is no concern that the output image obtained by combining the processed divided images may become an unnatural image.

2. Second Embodiment

In a second embodiment, a case in which signal processing on image signals of a plurality of viewpoints is performed in parallel will be described. A case in which signal processing, for example, on an image signal of a left viewpoint and an image signal of a right viewpoint is performed in parallel will be described below.

Figure 6:
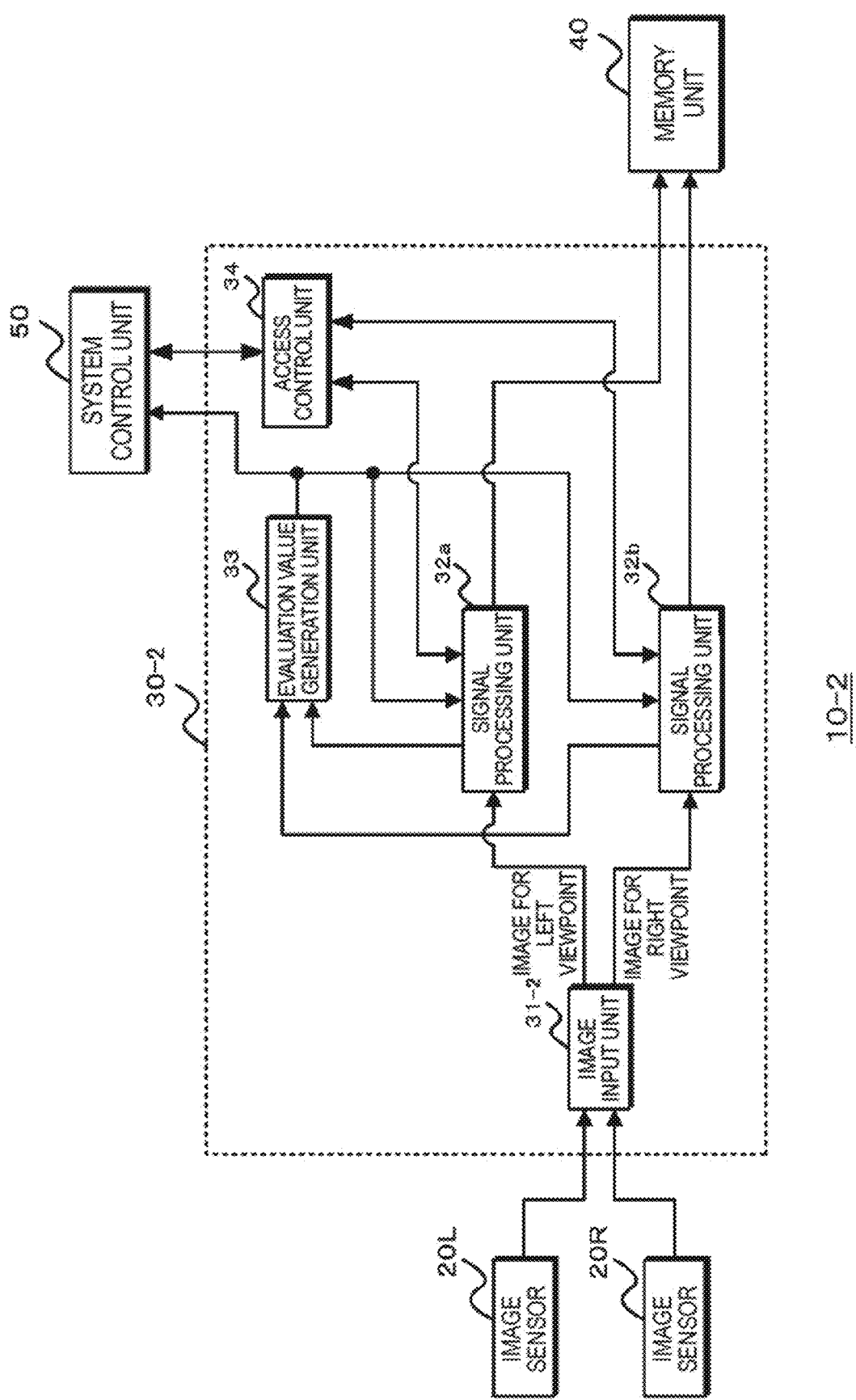
FIG. 6 is a diagram illustrating an exemplified configuration according to a second embodiment.

FIG. 6 is a diagram illustrating an exemplified configuration according to the second embodiment. In the second embodiment, an image sensor 20L generates an image signal of the left viewpoint image and outputs the generated image signal to an image processing unit 30-2. An image sensor 20R generates an image signal of a right viewpoint image and outputs the generated image signal to the image processing unit 30-2. The image processing unit 30-2 includes an image input unit 31-2, signal processing units 32a and 32b, an evaluation value generation unit 33, and an access control unit 34.

For example, the image input unit 31-2 outputs the image signal of the left viewpoint image and the image signal of the right viewpoint image to the signal processing units 32a and 32b in a division manner, respectively.

The signal processing unit 32a performs a correction process on the image signal of the left viewpoint image supplied from the image input unit 31-2. The signal processing unit 32a outputs the image signal subjected to the correction process to the evaluation value generation unit 33. The signal processing unit 32a performs various kinds of signal processing on the image signal subjected to the correction process to realize high image quality based on an evaluation value generated by the evaluation value generation unit 33 or a control value supplied from the system control unit 50 via the access control unit 34.

The signal processing unit 32b performs a correction process on the image signal of the right viewpoint image supplied from the image input unit 31-2. The signal processing unit 32b outputs the image signal subjected to the correction process to the evaluation value generation unit 33. The signal processing unit 32b performs various kinds of signal processing on the image signal subjected to the correction process to realize high image quality based on an evaluation value generated by the evaluation value generation unit 33 or a control value supplied from the system control unit 50 via the access control unit 34.

The evaluation value generation unit 33 causes the signal selection unit 332 shown in FIG. 2 to select any one of the image signals supplied from the signal processing units 32a and 32b and generates the evaluation value using the selected image signal. In the selection of the image signal, the image signal of the main viewpoint is selected. For example, the image signal is selected by setting a viewpoint designated in advance by a user or the like as the main viewpoint. In the selection of the image signal, the image signals of different viewpoints are sequentially selected and the evaluation values may be generated. Further, when the image signals of different viewpoints are sequentially selected and the evaluation values are generated, a statistical value such as an average value obtained by performing statistical processing on the evaluation values corresponding to the number of viewpoints may be calculated and the statistical value may be output as the evaluation value to be used in the signal processing to each signal processing unit.

In the second embodiment, since the signal processing on the image signals of a plurality of viewpoints is performed in parallel, it is not necessary to combine the images subjected to the signal processing so that the signal processing on the divided images can be performed. Therefore, the image processing unit 30-2 may output the image signal subjected to the signal processing to an external device or the like without storage on the memory unit 40. Further, the same also applies to third and fourth embodiments to be described below.

In the second embodiment, the plurality of signal processing units can be controlled collectively, even when which signal processing is performed on the image signals of the viewpoints is not individually controlled. Accordingly, even when the signal processing on the image signals of the viewpoints is performed in parallel, it is possible to prevent the increase in the control load.

3. Third Embodiment

In a third embodiment, a case in which signal processing on image signals of a moving image and a still image is performed in parallel will be described. An image sensor 20 generates an image signal of a moving image by performing a process of thinning pixels or lines in a horizontal direction and reading pixel signals in accordance with the resolution of the moving image, and outputs the generated image signal to an image processing unit 30-3. Further, the image sensor 20 generates an image signal of a still image with a resolution higher than that of a moving image while capturing the moving image by reading the pixel signals without performing the thinning process and outputs the generated image signal to the image processing unit 30-3.

Figure 7:
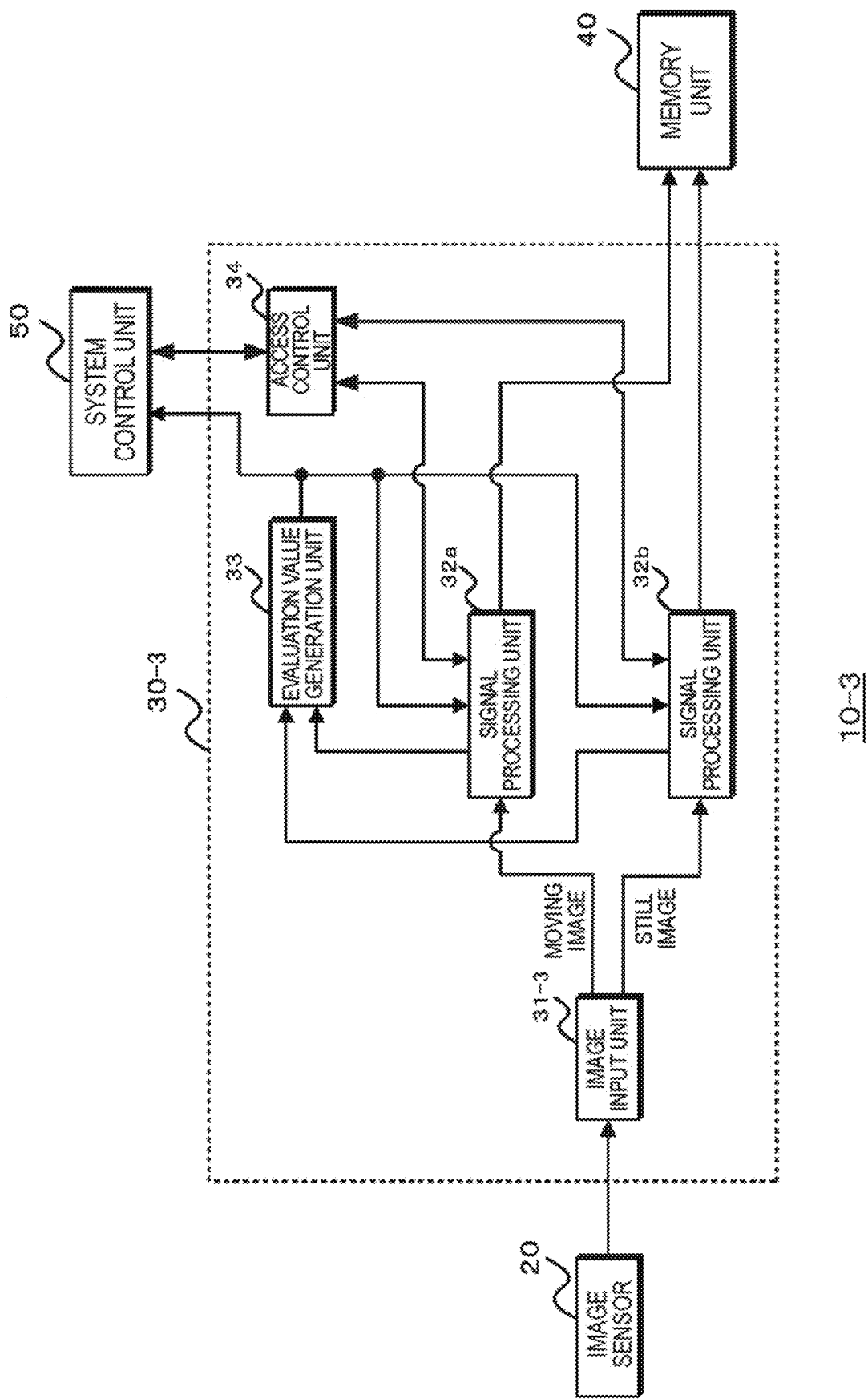
FIG. 7 is a diagram illustrating an exemplified configuration according to a third embodiment.

FIG. 7 is a diagram illustrating an exemplified configuration according to the third embodiment. In the third embodiment, the image processing unit 30-3 includes an image input unit 31-3, signal processing units 32a and 32b, an evaluation value generation unit 33, and an access control unit 34, as in the second embodiment.

The image input unit 31-3 outputs the image signal of the moving image and the image signal for the still image to the signal processing units 32a and 32b in a division manner, respectively.

The signal processing unit 32a performs a correction process on the image signal of the moving image supplied from the image input unit 31-3. The signal processing unit 32a outputs the image signal subjected to the correction process to the evaluation value generation unit 33. The signal processing unit 32a performs various kinds of signal processing on the image signal subjected to the correction process to realize high image quality based on an evaluation value generated by the evaluation value generation unit 33 or a control value supplied from the system control unit 50 via the access control unit 34.

The signal processing unit 32b performs a correction process on the image signal of the still image supplied from the image input unit 31-3. The signal processing unit 32b outputs the image signal subjected to the correction process to the evaluation value generation unit 33. The signal processing unit 32b performs various kinds of signal processing on the image signal subjected to the correction process to realize high image quality based on an evaluation value generated by the evaluation value generation unit 33 or a control value supplied from the system control unit 50 via the access control unit 34.

The evaluation value generation unit 33 causes the signal selection unit 332 shown in FIG. 2 to select any one of the image signals supplied from the signal processing units 32a and 32b and generates the evaluation value using the selected image signal.

When the image signal of the still image is generated while capturing the moving image, the still image is an image which is present at one time point of the moving image and is substantially the same as a moving image immediately before the generation of the still image or immediately after the generation of the still image. Accordingly, the signal selection unit 332 selects an image signal of the moving image.

In the third embodiment, the signal processing units can be controlled collectively, even when which signal processing is performed on the image signals of the moving image and the still image for each image signal is not controlled. Accordingly, even when the signal processing on the image signals of the moving image and the still image is performed in parallel, it is possible to prevent the increase in the control load.

4. Fourth Embodiment

In a fourth embodiment, a case in which signal processing on image signals of still images is performed in parallel will be described. For example, an image sensor 20 outputs, to an image processing unit 30-4, image signals of a plurality of still images captured consecutively when an operation mode is a continuous shooting mode.

Figure 8:
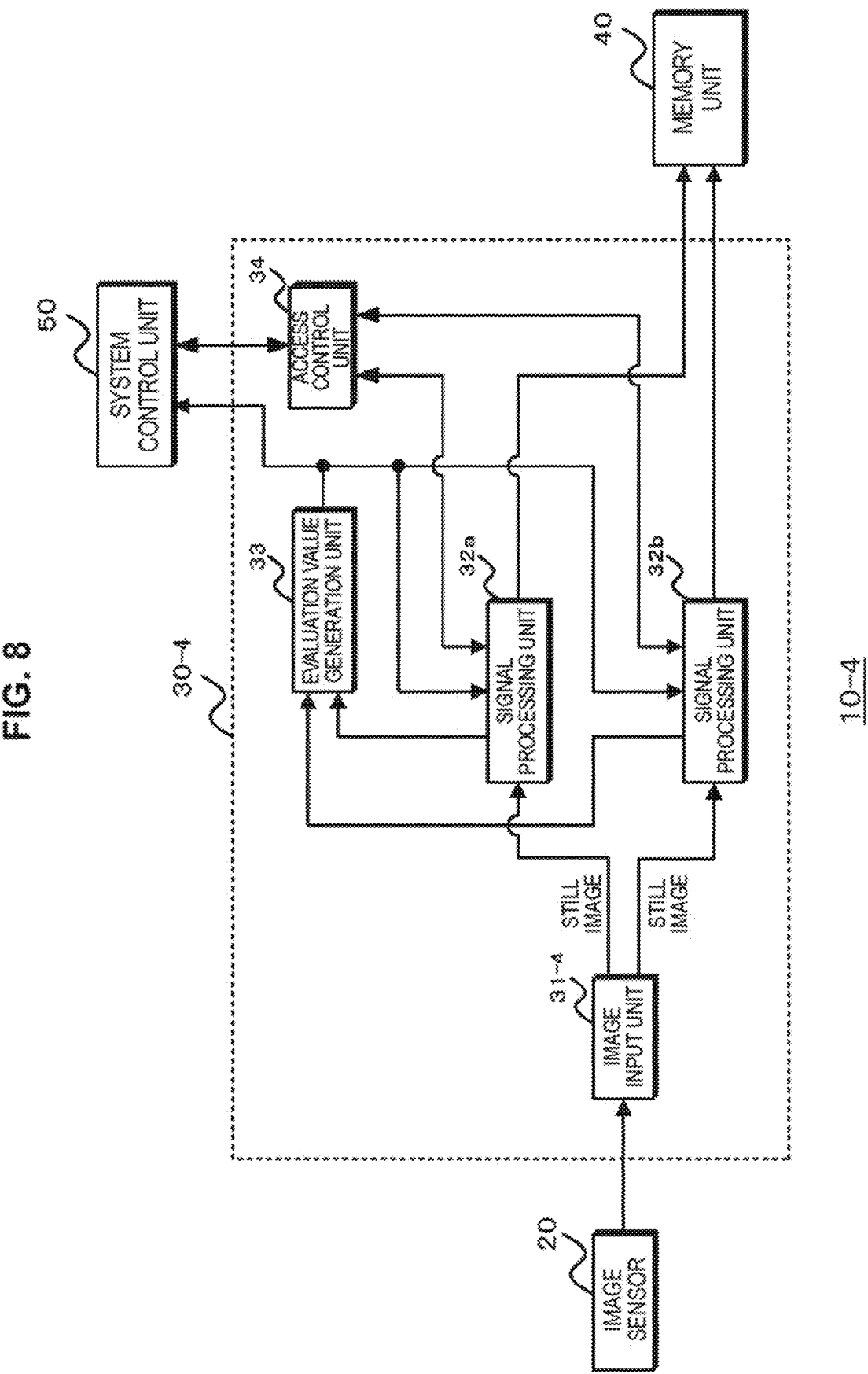
FIG. 8 is a diagram illustrating an exemplified configuration according to a fourth embodiment.

FIG. 8 is a diagram illustrating an exemplified configuration according to the fourth embodiment. In the fourth embodiment, the image processing unit 30-4 includes an image input unit 31-4, signal processing units 32a and 32b, an evaluation value generation unit 33, and an access control unit 34, as in the second and third embodiments.

The image input unit 31-4 distributes the image signals of the plurality of sequentially supplied still images in units of images, for example, alternately to the signal processing units 32a and 32b.

The signal processing unit 32a performs a correction process on the image signal of the still image supplied from the image input unit 31-4. The signal processing unit 32a outputs the image signal subjected to the correction process to the evaluation value generation unit 33. The signal processing unit 32a performs various kinds of signal processing on the image signal subjected to the correction process to realize high image quality based on an evaluation value generated by the evaluation value generation unit 33 or a control value supplied from the system control unit 50 via the access control unit 34.

The signal processing unit 32b performs a correction process on the image signal of the still image supplied from the image input unit 31-4. The signal processing unit 32b outputs the image signal subjected to the correction process to the evaluation value generation unit 33. The signal processing unit 32b performs various kinds of signal processing on the image signal subjected to the correction process to realize high image quality based on an evaluation value generated by the evaluation value generation unit 33 or a control value supplied from the system control unit 50 via the access control unit 34.

The evaluation value generation unit 33 causes the signal selection unit 332 shown in FIG. 2 to select any one of the image signals supplied from the signal processing units 32a and 32b and generates the evaluation value using the selected image signal. Here, when the image signals of the plurality of still images are supplied to the image input unit 31-4, the image signal supplied from the signal processing unit to which the image signal of the first still image is input is selected so that the evaluation value can be generated promptly. Further, the signal selection unit 332 may select the image signal in accordance with the distribution of the image signals to the plurality of signal processing units in units of images, and the evaluation value may be generated for the image to be subjected to the signal processing. In this case, as in the supply of the control value from the system control unit 50, the select signal is set to be active for the signal processing unit that performs the signal processing on the image signal to be used in calculation of the evaluation value. Thus, even when the evaluation value is supplied to each signal processing unit, the signal processing can be performed using the evaluation value corresponding to the image signal to be processed.

In the fourth embodiment, the control on the signal processing units can be performed collectively, even when the control is not performed on each signal processing unit performing signal processing on the image signal of the still image in accordance with the image to be processed. Accordingly, even when the signal processing on the image signals of the plurality of still images is performed in parallel, it is possible to prevent the increase in the control load. Further, in the fourth embodiment, the case in which the image signals of the plurality of consecutively captured still images are processed has been described. However, the same process can be processed when frame images of the moving image are distributed in order to the signal processing units.

5. Fifth Embodiment

In the above-described embodiments, the cases in which the image signals are supplied from the signal processing units 32a and 32b to the evaluation value generation unit 33 and the evaluation values are generated have been described. However, the image signals used in the generation of the evaluation values may be supplied from an image input unit 31-5.

FIG. 9 is a diagram illustrating an exemplified configuration according to the fifth embodiment. In the fifth embodiment, the image processing unit 30-5 includes the image input unit 31-5, signal processing units 32a and 32b, an evaluation value generation unit 33, and an access control unit 34.

The image input unit 31-5 divides, for example, an image signal read from an imaging element into signals of two image regions. The image input unit 31-5 outputs the image signal of one image region to the signal processing unit 32a and outputs the image signal of the other image region to the signal processing unit 32b. Further, the image input unit 31-5 outputs the image signal before the division to the evaluation value generation unit 33.

The signal processing unit 32a performs a correction process on the image signal of the moving image supplied from the image input unit 31-5. The signal processing unit 32a performs various kinds of signal processing on the image signal subjected to the correction process to realize high image quality based on an evaluation value generated by the evaluation value generation unit 33 or a control value supplied from the system control unit 50 via the access control unit 34.

The signal processing unit 32b performs a correction process on the image signal of the moving image supplied from the image input unit 31-5. The signal processing unit 32b performs various kinds of signal processing on the image signal subjected to the correction process to realize high image quality based on an evaluation value generated by the evaluation value generation unit 33 or a control value supplied from the system control unit 50 via the access control unit 34.

The evaluation value generation unit 33 causes the signal selection unit 332 shown in FIG. 2 to select the image signal supplied from the image input unit 31-5 and generates the evaluation value using the selected image signal.

In the fifth embodiment, the plurality of signal processing units can be controlled collectively, even when which signal processing is performed on the image signal of each image region after the image division is not controlled. Accordingly, even when the signal processing on the image signals is performed in parallel, it is possible to prevent the increase in the control load. Further, since the evaluation value is generated based on the image signal supplied from the image input unit, the evaluation value can be generated independently from the signal processing unit without association with a circuit configuration or the like of the signal processing unit.

The present technology should not be construed as limited to the above-described embodiments. For example, the process performed using the evaluation values is not limited to the above-described processes. Further, the process performed by the signal processing unit is not limited to the process for high image quality, but a process for another goal may be performed. The embodiments of the present technology disclose the present technology in exemplary forms, and thus it is apparent to those skilled in the art that the embodiments of the present technology can be corrected or substituted within the scope of the present technology within the gist of the present technology. That is, the claims should be referred to comprehend the gist of the embodiments of the present technology.

Additionally, the image processing device of the present technology may also be configured as below.

(1) An image processing device including:
an image input unit that performs image division on an input image;
an evaluation value generation unit that generates an evaluation value based on an image signal of the input image; and
a plurality of signal processing units that perform signal processing on the image signal based on the evaluation value generated by the evaluation value generation unit,
wherein the plurality of signal processing units perform the signal processing using image signals of divided images divided by the image input unit.

(2) The image processing device according to (1),
wherein the plurality of signal processing units each perform the signal processing using an image signal obtained after a correction process and output the image signal obtained after the correction process to the evaluation value generation unit, and
wherein the evaluation value generation unit performs image combining using the image signals obtained after the correction process and supplied from the plurality of signal processing units and generates the evaluation value based on an image signal of a combined image.

(3) The image processing device according to (1) or (2), wherein the image input unit sets the number of divisions of the input image in accordance with the number of signal processing units.

(4) The image processing device according to (1),
wherein the plurality of signal processing units perform the signal processing using the image signal obtained after the correction process and output the image signal obtained after the correction process to the evaluation value generation unit, and
wherein the evaluation value generation unit generates the evaluation value using at least one of the image signals obtained after the correction process and supplied from the plurality of signal processing units.

(5) The image processing device according to any one of (1) to (4), further including:
an access control unit that designates one or more of the signal processing units acquiring a control value for controlling the signal processing based on address information associated with the control value,
wherein the signal processing unit designated by the access control unit performs the signal processing based on the acquired control value.

(6) The image processing device according to any one of (1) to (5), wherein the evaluation value generation unit generates the evaluation value based on an image signal of the input image that is reduced.

(7) The image processing device according to (1),
wherein the plurality of signal processing units perform the signal processing on image signals of different viewpoints, and
wherein the evaluation value generation unit generates the evaluation value based on an image signal of a predetermined viewpoint.

(8) The image processing device according to (7), wherein the evaluation value generation unit generates the evaluation value for the image signal of the predetermined viewpoint and the evaluation value for each image signal of a different viewpoint and outputs an evaluation value obtained by performing statistical processing on the plurality of generated evaluation values to the plurality of signal processing units.

(9) The image processing device according to (1),
wherein the plurality of signal processing units each include a signal processing unit that performs signal processing on an image signal of a moving image and a signal processing unit that performs signal processing on an image signal of a still image, and
wherein the evaluation value generation unit generates the evaluation value based on the image signal of the moving image.

(10) The image processing device according to (9), wherein the still image is one time point of the moving image.

(11) The image processing device according to (1), further including:
an image input unit that distributes the input image to the plurality of signal processing units for each frame,
wherein the plurality of signal processing units perform the signal processing using an image signal of the image distributed from the image input unit, and wherein the evaluation value generation unit selects an image in accordance with the distribution of the input image and generates the evaluation value based on an image signal of the selected image.

In the image processing device and image processing method of the embodiments of the present technology, the image division is performed on the input image. Further, the evaluation value generation unit generates the evaluation value based on the image signal of the input image, and the plurality of signal processing units perform the signal processing on the image signals of the divided images based on the generated evaluation value. Therefore, the plurality of signal processing units can be controlled collectively, even when the valuation value is not generated by each of the plurality of signal processing units and which signal processing is performed on the image signals of the moving image and the still image is not controlled. Accordingly, by providing the plurality of signal processing units, it is possible to prevent the increase in the control load. Thus, the embodiments of the present technology can be applied to various devices, such as imaging devices or editing devices, using an image signal.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
    an image input unit that performs image division on an input image;
    an evaluation value generation unit that generates an evaluation value based on an image signal of the input image; and
    a plurality of signal processing units that perform signal processing on the image signal based on the evaluation value generated by the evaluation value generation unit,
    wherein the signal processing units of the plurality of signal processing units perform the signal processing using image signals of divided images divided by image input unit,
    wherein each signal processing unit of the plurality of signal processing units performs the signal processing after a correction process and outputs the image signal obtained after the correction process to the evaluation value generation unit, and
    wherein the evaluation value generation unit performs image combining using the image signals obtained after the correction process and supplied from the plurality of signal processing units and generates the evaluation value based on the image signal of a combined image.

2. The image processing device according to claim 1, wherein the image input unit sets the number of divisions of the input image in accordance with the number of signal processing units.

3. The image processing device according to claim 1,
    wherein the plurality of signal processing units perform the signal processing using the image signal obtained after the correction process and output the image signal obtained after the correction process to the evaluation value generation unit, and
    wherein the evaluation value generation unit generates the evaluation value using at least one of the image signals obtained after the correction process and supplied from the plurality of signal processing units.

4. The image processing device according to claim 1, further comprising:
    an access control unit that designates one or more of the signal processing units acquiring a control value for controlling the signal processing based on address information associated with the control value,
    wherein the signal processing unit designated by the access control unit performs the signal processing based on the acquired control value.

5. The image processing device according to claim 1, wherein the evaluation value generation unit generates the evaluation value based on an image signal of the input image that is reduced.

6. The image processing device according to claim 1,
    wherein the plurality of signal processing units perform the signal processing on image signals of different viewpoints, and
    wherein the evaluation value generation unit generates the evaluation value based on an image signal of a predetermined viewpoint.

7. The image processing device according to claim 6, wherein the evaluation value generation unit generates the evaluation value for the image signal of the predetermined viewpoint and the evaluation value for each image signal of a different viewpoint and outputs an evaluation value obtained by performing statistical processing on the plurality of generated evaluation values to the plurality of signal processing units.

8. The image processing device according to claim 1,
    wherein the plurality of signal processing units each include a signal processing unit that performs signal processing on an image signal of a moving image and a signal processing unit that performs signal processing on an image signal of a still image, and
    wherein the evaluation value generation unit generates the evaluation value based on the image signal of the moving image.

9. The image processing device according to claim 8, wherein the still image is one time point of the moving image.

10. The image processing device according to claim 1, further comprising:
    an image input unit that distributes the input image to the plurality of signal processing units for each frame,
    wherein the plurality of signal processing units perform the signal processing using an image signal of the image distributed from the image input unit, and
    wherein the evaluation value generation unit selects an image in accordance with the distribution of the input image and generates the evaluation value based on an image signal of the selected image.

11. An image processing method comprising:
    one or more computer processors configured to:
    perform image division on an input image;
    generate an evaluation value based on an image signal of the input image;
    perform signal processing on image signals of divided images divided through the image division based on the generated evaluation value; and
    wherein the signal processing units of the plurality of signal processing units perform the signal processing using image signals of divided images divided by image input unit,
    wherein each signal processing unit of the plurality of signal processing units performs the signal processing after a correction process and outputs the image signal obtained after the correction process to the evaluation value generation unit, and
    wherein the evaluation value generation unit performs image combining using the image signals obtained after the correction process and supplied from the plurality of signal processing units and generates the evaluation value based on the image signal of a combined image.

* * * * *